United States Patent [19]
Patton et al.

[11] Patent Number: 4,843,902
[45] Date of Patent: Jul. 4, 1989

[54] CONTROL SYSTEM FOR POWERSHIFT TRANSMISSION CLUTCHES

[75] Inventors: Jon R. Patton; Robert W. Harris, both of Coffeyville, Kans.

[73] Assignee: Cooper Industries, Inc., Houston, Tex.

[21] Appl. No.: 208,798

[22] Filed: Jun. 16, 1988

Related U.S. Application Data

[63] Continuation of Ser. No. 894,187, Aug. 7, 1986.

[51] Int. Cl.⁴ .................. B60K 20/10; B60K 20/12
[52] U.S. Cl. ...................................... 74/335; 74/360; 192/3.58
[58] Field of Search ............ 74/335, 336 R, 360, 74/866, 867; 192/52, 103 F, 3.58, 0.052, 0.073, 0.092

[56] References Cited

U.S. PATENT DOCUMENTS

| | | | |
|---|---|---|---|
| 2,701,477 | 2/1955 | Schoepe | 74/335 |
| 2,956,659 | 4/1958 | Grant | 192/85 AA |
| 3,422,939 | 1/1969 | Henry-Biabaud | 74/335 |
| 3,874,255 | 4/1975 | Minami | 74/866 |
| 3,893,345 | 7/1975 | Sisson et al. | 74/360 |
| 4,090,414 | 5/1978 | White | 74/335 |
| 4,116,321 | 9/1978 | Miller | 192/103 F |
| 4,259,882 | 4/1981 | Miller | 74/866 |
| 4,380,278 | 4/1983 | Lasken | 192/3.58 |
| 4,452,101 | 6/1984 | Fujioka | 74/335 X |
| 4,474,082 | 10/1984 | Spokas et al. | 74/866 |
| 4,479,399 | 10/1984 | Narveson et al. | 192/3.58 X |
| 4,506,773 | 3/1985 | Schott | 192/52 |
| 4,603,603 | 8/1986 | Salmon | 74/866 X |
| 4,646,895 | 3/1987 | Horsch | 192/3.58 X |

*Primary Examiner*—Dirk Wright
*Attorney, Agent, or Firm*—David A. Rose

[57] ABSTRACT

A control system for a multi-speed powershift gear transmission having multiple hydraulically actuated speed range clutches and directional clutches includes a control valve module having solenoid operated valves for conducting pressure fluid to a selected one of the speed range clutches and a selected one of the directional clutches. A pressure regulator valve is in circuit with the directional clutch control valves and is acted on by pilot pressure fluid controlled by a proportional solenoid type control valve wherein the pressure rate of rise in the directional clutches may be selectively controlled in accordance with the particular shift condition initiated and based on a previous transmission operating condition. The control unit provides for a predetermined pressure rate of rise signal to the pressure regulator valve based on the selected shift condition and the previous operating condition of the transmission.

18 Claims, 2 Drawing Sheets

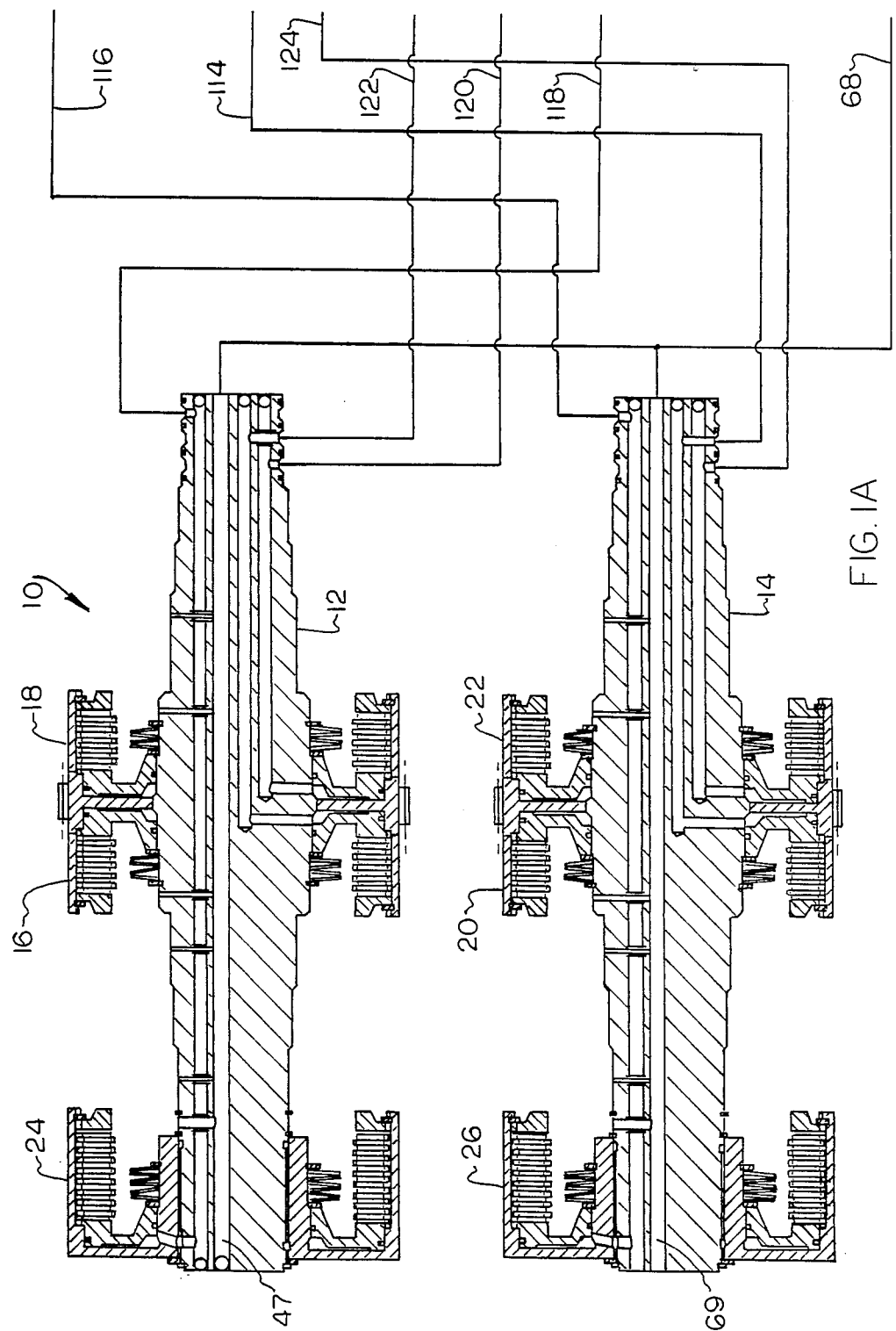
FIG. IA

4,843,902

CONTROL SYSTEM FOR POWERSHIFT TRANSMISSION CLUTCHES

Related Application

This is a continuation application of co-pending application Ser. No. 06/894,187, filed Aug. 7, 1986.

BACKGROUND OF THE INVENTION

1. Field of the Invention the present invention pertains to a control system for controlling the engagement and disengagement of hydraulically actuated clutches in a power shift type gear transmission.

2. Background

The widespread use of powershift type vehicle speed range and directional control power trnasmissions has contributed to the productivity of various types of on and off road vehicles. One problem that has been addressed to some extent in the development of powershift transmissions is control over engaging and disengaging of the speed range gear and directional gear clutches. Understandably, the requirements for shifting a clutch under load to provide comfort for the vehicle operator, preventing unduly stressing components in the drive train and prolonging transmission life have been difficult to solve but certain advantages arise from the use of electrical control devices which are capable of providing various electrical signals to effect operation of hydraulic control circuits.

U.S. Pat. Nos. 3,874,255 to T. Minami, U.S. Pat. No. 4,116,321 to A. L. Miller, U.S. Pat. No. 4,259,822 to A. L. Miller U.S. Pat. No. 4,380,278 to R. D. Lasken and U.S. Pat. No. 4,474,082 to Spokas et al are examples of prior efforts to develop systems and components for electro-hydraulically controlled powershift transmissions. Although somewhat sophisticated and elaborate control systems are described in some of the above mentioned patents, there has been a desire and need to provide a simplified and yet suitable control system for powershift type transmissions which are adapted to control the pressure rate of rise in at least the forward and reverse directional clutches whereby improved shift control can be obtained when shifting the transmission to achieve a speed range shift as well as a directional shift. It is to this end that the present invention has been developed with a view to providing a simplified and unique electrically operated control system for hydraulically actuated clutches in a powershift type gear transmission.

SUMMARY OF THE INVENTION

The present invention provides an improved control system for operating hydraulically actuated clutches in a multi-speed reversible powershift type gear transmission. A series of speed range clutch control valves are selectively operated electrically to provide a given transmission output speed and a forward or reverse directional clutch is also selectively cont rolled during a shift operation to improve transmission performance by reducing shock loading on the transmission, the vehicle drive system and to minimize undesirable acceleration rates on the vehicle operator.

In accordance with one aspect of the present invention there is provided a hydraulic control system for plural hydraulically actuated clutches in a powershift type gear transmission wherein a plurality of speed range clutches are engaged or disengaged by the operation of respective electrically controlled valves and engagement and disengagement of the transmission with respect to a propulsion system is simultaneously carried out by disengagement and re-engagement of directional control clutches. The directional control clutches are energized by hydraulic fluid which is supplied at a controlled pressure rate of rise by a variable pressure regulator valve controlled by pilot pressure fluid, the pressure of which is varied by a proportional solenoid type control valve.

In accordance with the invention engagement of the transmission with the drive system can be controlled for everyshift condition by the energization of one speed range clutch control valve, one directional clutch control valve and a throttling valve which in effect varies the pressure acting on a pilot pressure regulator valve to vary the pressure rate of rise acting on one of the directional clutches only. In this way the speed range clutches are not required to be slipped and only the forward and/or reverse directional clutches are subject to controlled slipping under load. Such an arrangement simplifies the requirements of the clutch cooling and lubricating fluid flow circuit and the directional clutches may be mounted in the transmission for easy access and servicing since these clutches are subject to higher rates of wear.

In accordance with yet another aspect of the present invention there is provided a transmission control system wherein the speed and direction of rotation demanded by the operator is translated into electrical signals which when applied to electrically operated control valves causes engagement of appropriate directional and speed clutches, and provides a signal to an electrically operated control valve for controlling the pressure rate of rise in at least one directional clutch.

In accordance with still a further aspect of the present inventioin a powershift transmission control system is provided with a single pressure regulator or modulator valve controlled by a single electrically operated valve for varying the pressure rate of rise acting on a selected clutch in the transmission itself.

Other advantages and superior features of the present invention will become apparent to those skilled in the art upon reading the detailed description which follows in conjunction with the drawing.

BRIEF DESCRIPTION OF THE DRAWING

FIGS. 1A and 1B comprise a schematic diagram of a powershift transmission and electro hydraulic clutch actuation control system in accordance with the present invention.

DESCRIPTION OF A PREFERRED EMBODIMENT

Figure 1B:
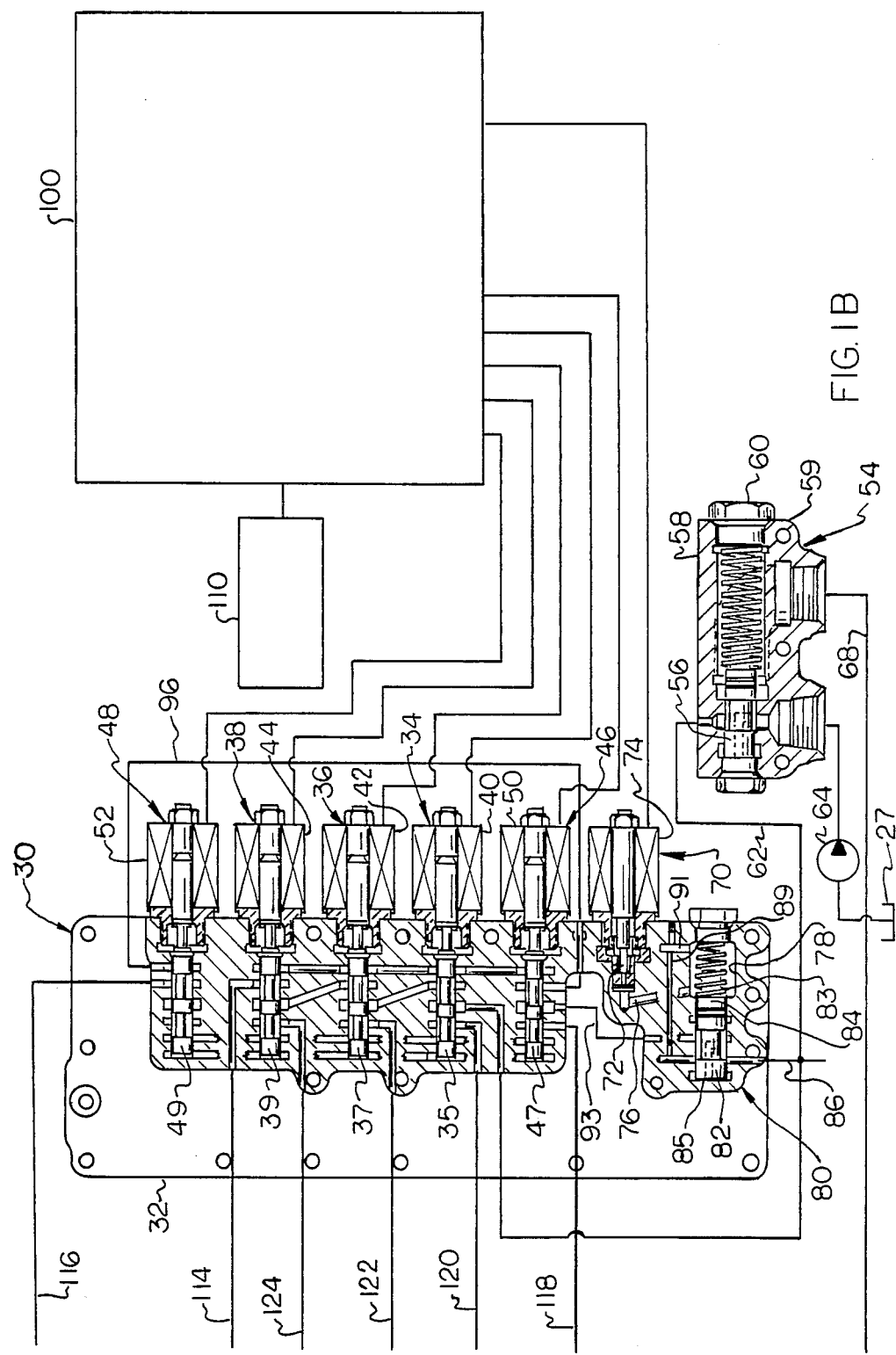

In the description which follows like parts are marked throughout the specification and drawing with the same reference numerals, respectively. The drawing FIGS. are at least partly in schematic form in the interest of clarity and are intended to be viewed together.

Referring to the drawing, there is illustrated a hydraulic control circuit for actuating a plurality of speed range and directional clutches for a powershift type gear transmission generally designated by the numeral 10. Only a portion of the gear transmission 10 is illustrated, including respective clutch shafts 12 and 14 on which are supported, respectively, speed range clutches 16 and 18 associated with the shaft 12 and speed range clutches 20 and 22 associated with the shaft 14. A forward directional clutch 24 is associated with the shaft 12 and a reverse directional clutch 26 is associated with the shaft 14. Only those portions of the transmission 10 pertinent to an understanding of the control circuit of the present invention are illustrated and described herein. Those skilled in the art will recognize the general type of powershift transmission from the illustrations and description herein. For a further description of a type of transmission for which the control system of the present invention is particularly adapted reference may be made to U.S. Pat. No. 3,913,411 to J. J. Jameson and assigned to the assignee of the present invention. A specific transmission configuration well suited for use with the control system of the present invention is disclosed in U.S. Pat. application Ser. No. 751,761 filed July 1, 1985 of John M. Beeson et al and assigned to the assignee of the present invention.

The slutches 16, 18, 20, 22, 24 and 26 are each characterized by a plurality of stacked annular disks which are forcibly engaged with each other by a piston operable to bbe acted on by hydraulic fluid supplied through a control valve module, generally designated by the numeral 30. The valve module 30 includes a housing 32 provided with a plurality of suitable bores and passages for conducting hydraulic fluid to and from the aforementioned speed change and directional change clutches. The housing 32, for example, includes respective solenoid actuated speed range clutch control valves 34, 36 and 38. The valves 34, 36 and 38 each include axially movable spool members 35, 37 and 39 which are, respectively, suitably connected to solenoid actuators 40, 42 and 44. The valve module 30 further includes directional clutch control valves 46 and 48 associated with the respective forward and reverse directional clutches 24 and 26. The valves 46 and 48 also include respective spool members 47 and 49 which are operable to be moved by respective solenoid actuators 50 and 52.

In accordance with one unique aspect of the present invention the speed range clutch control valves and clutches are supplied with hydraulic fluid from a main pressure regulator valve 54 including a spool type closure member 56 disposed in a bore formed in a valve housing portion 58 which may be part of the housing 32 but is shown separated therefrom in the interest of clarity. The spool member 56 is spring biased by a regulator spring 59 which is adjustable by a closure cap 60 to adjust the regulated pressure of hydraulic fluid which is supplied through a conduit 62 to each of the valves 34, 36 and 38. Pressure fluid is supplied to the valve 54 by a suitable pump 64, from sump 27 illustrated schematically in FIG. 1B.

The valve 54 is of a type which provides a substantially constant regulated pressure to the conduit 62 by valving excess pressure fluid through a conduit 68 and suitable lubricating and cooling flow passages 67 and 69 disposed in the respective shafts 12 and 14 for supplying a substantial flow of cooling and lubricating fluid to the directional clutches 24 and 26 and further adequate amounts of coolant and lubricating fluid to the speed range clutches also.

The control valve module 30 further includes a solenoid operated valve, generally designated by the numeral 70, including a needle type closure member 72 and a solenoid actuator 74 connected thereto. The closure member 72 is operable to vent pressure fluid from a conduit 76 and a chamber 78 in controlled amounts so as to regulate the pressure of the fluid in the chamber 78 to sump 27.

The control valve module 30 still further includes a pressure regulator valve 80 including a spool type closure member 82 disposed in a bore 84 formed in the valve housing 32 and operable to be interposed in a conduit 86 which is in communication with the regulated pressure fluid supply conduit 62. The conduit 86 is in communication with a conduit portion 89 in which a suitable adjustable flow restrictor orifice 91 is disposed for supplying pilot pressure fluid to the chamber 78. Pressure fluid in the chamber 78 acts on a piston face 83 of the closure member 82 to bias the closure member to a position to increase the flow of fluid from the conduit 62 to a conduit 93 leading to the valve 46. Pressure fluid entering the bore 84 from conduit 86 may also act on an opposite piston face 85 to bias the closure member 82 in the opposite direction. The valve 46 is interconnected with the valve 48 by a conduit 96.

The solenoid actuators for the valves 40, 42, 44, 46, 48 and 70 are operably connected to an electronic control circuit, generally designated by the numeral 100. The transmission control systme also includes a speed range and directional control selector unit 110 which is adapted to be actuated by the operator of the vehicle in connection with which the transmission 10 is used. In accordance with the selection of a particular speed range and output shaft direction, a signal is transmitted from the controller 110 to the electronic control circuit 100. The preprogrammed logic in the control circuit allows the electronic control circuit 100 to generate signals to initiate a shift based on a predetermined desired control over the hydraulic pressure rate of rise when shifting to a particular speed range and direction of rotation from a previous speed range and direction of rotation condition.

The electronic control circuit 100, for example, can be programmed to provide a predetermined set of signals based on the particular application of the transmission 10 as regards vehicle type, size, load capacity and other variables which may effect transmission performance. The electronic control circuit 100 may also prevent certain shift sequences such as a shift from a condition of fourth gear in forward direction to a condition of fourth gear in reverse since such a shift sequence would very likely place an intolerable load on the transmission and drive train of the vehicle.

The operation of the control circuit 100 will now be described for a typical series of selected shift conditions. It will be assumed that the transmission 10 is initially in a so called neutral condition with both the forward and reverse directional clutches disengaged. In this operating condition the solenoid actuators for all of the valves are de-energized, placing the valves 34, 36 and 38 in a position such that hydraulic fluid may flow through the conduit 62 and the valves 34, 36 and 38 by way of suitable connecting passages in housing 32 and a conduit 114 to the fourth speed range clutch 20 holding this clutch in an engaged condition. The position of the valves 46 and 48 will also premit fluid flow through conduits 86 and 89, through the valve 46 and to the valve 48 by way of conduit 96. The positions of the valves 46 and 48, when their respective solenoids are de-energized, permits the flow of fluid from the valve 46 to the valve 48 where it is blocked from flow to the reverse directional clutch 26 through a condiut 116.

Both the forward directional clutch 24 and the reverse directional clutch 26 have their respective hydraulic piston chambers vented through the associated valves 46 and 48 to a suitable sump 27, not shown. The positions of the valves 34, 36 and 38 described above also provide for venting of the piston chambers of the respective clutches 18, 16, and 22 through the housing 32 to a suitable sump 27, not shown. The solenoid 74 of the valve 70 is also de-energized to permit this valve to be in a closed condition to allow pressure to build in chamber 78, thus moving spool 82 to open conduit 93 to sump 27.

If the operator, for example, actuates the speed range and directional control unit 110 to place the transmission in first gear in the forward direction, the electronic control circuit translates this command into electronic signals which when applied to the electrically operated control valves causes engagement of the appropriate speed and directional clutches. Furthermore, the electronic control module not only supplies electrical signals to cause appropriate clutch engagement but also supplies an electronic signal to control the manner in which clutches are engaged. For example, upon shifting to the forward direction in first gear a signal is delivered to the solenoid 50 of the valve 46 placing the valve in a condition to conduct pressure fluid to the clutch 24 through a conduit 118 and to prevent conduction of fluid through the conduit 96 to the valve 48. Simultaneously, a signal is delivered to the valve 34 shifting this valve into a position to conduct fluid to the clutch 18 by way of a conduit 120 and to prevent conduction of fluid to the valves 36 and 38. At the same instant that signals are delivered to the solenoid actuators 40 and 50 a variable intensity signal is delivered to the solenoid 74 to open then progressively close the valve 70 to increase the fluid pressure in the chamber 78 thereby progressively shifting the valve spool 82 to increase the flow of pressure fluid through the valve 46 to the forward directional clutch 24.

The rate at which the pressure can be increased in the chamber 78 is controlled by the control unit 100 in accordance with the particular shift sequence which has been initiated. For example, in shifting to the first gear or highest reduction ratio the pressure rate of rise may be relatively rapid since the resultant transmission output torque and output speed will be suitable to provide an acceleration rate of the vehicle which will not unduly stress the drive train or create operator discomfort. On the other hand the rate at which current is applied to the solenoid 74 when shifting from first gear to third or fourth gear directly in a forward direction might require that the pressure rate of rise be substantially altered to allow more time for clutch engagement and slippage so as to provide for some vehicle acceleration before full clutch engagement pressure is applied.

The signals generated by the control unit 100 and applied to the valves 34, 36, 38, 46, 48 and 70 are such that, when shifting from one speed range to another, the solenoid 74 is actuated to control the pressure in the chamber 78 in such a way that the directional clutch engaged at the time of shifting from one speed range to another is momentarily disengaged or at least substantially slipped by allowing the actuating fluid pressure to be reduced. Accordingly, by controlling the pressure rate of rise applied to the directional clutches 24 and 26 only these clutches need be controlled through a proportional solenoid type valve such as the valve 70 and the speed range clutches 16, 18, 20 and 22 may be engaged prior to full engagement of the directional clutch and through control of only a two position solenoid valve such as the valves 34, 36 and 38.

If it is desired to initiate operation of the reverse direction clutch 26, the valve 46 is shifted to a position to permit relatively unrestricted flow of actuation fluid through the conduits 93, 96 and the valve 48 is shifted to a position to permit flow of fluid to the actuating piston of the clutch 26. Under these operating conditions pressure fluid is vented from the actuating chamber of clutch 24 to a suitable sump. When it is desired to engage the speed range clutch 16, the valve 34 is de-energized and placed in a position to permit flow through the valve 34 to the valve 36, which latter valve is shifted to conduct pressure fluid to the actuating piston for the clutch 16 through a conduit 122. In performing a shift from first gear in a forward direction to third gear in a forward or reverse direction the control signals delivered by the control unit 100 are timed such that the speed range clutches are respectively disengaged and engaged before the selected directional clutch is engaged. If a speed range change is initiated while maintaining the same direction of rotation of the transmission output shaft the directional clutch is momentarily disengaged during the change of speed range clutch engagement and the directional clutch is then re-engaged and the pressure rate of rise in the directional clutch piston chamber is brought up through control over the operation of the solenoid valve 70 and teh proportional movement of the valve spool 82 to accomplish the desired pressure increase in the directional clutch as a function of time. Still further, if the speed range clutches 20 or 22 are to be engaged the signals delivered from the ocntrol unit 100 will result in the valves 34 and 36 being placed in such a position as to conduct fluid to the valve 38, and the valve 38 is shifted into a position to conduct pressure fluid to either the clutch 20 through conduit 114 or the clutch 22 through a conduit 124.

Accordingly, in a typical transmission shifting operation when the selected transmission output shaft direction of rotation and the selected speed range clutch are determined with the selector unit 110, appropriate signals are generated within and transmitted from control unit 100 whereby the appropriate solenoid valves are energized such as the selected speed range clutch control valve and the selected directional clutch valve. These two vlaves are simultaneously controlled to place the selected speed range clutch in engagement and to provide for flow of fluid through the selected directional clutch valve and to the selected directional clutch. With a predetermined tiem delay the proportional solenoid valve 70 is energized such as by using a pluse width modulated current applied to the valve to control its opening or closing cycle to thereby control the pressure in the chamber 78 and the movement of the valve spool 82 so that the pressure rate of rise of fluid delivered to the selected direcfional clutch is controlled in accordance with a predetermined condition. The control unit 100 and the directional and speed range control selector 110 may be of a type commercially available such as a model 41000 electrical shift control quadrant manufactured by Funk Manufactring in conjunction with a logic circuit using a microprocessor such as a Motorola MC146805E2P chip as the base component. The proportional solenoid control valve 70 may also be of a type commercially available such as a type 35300-AA proportional valve manufactured by Cessna Fluid Power. The solenoid operated control valves 34, 36, 38, 46 and 48 may also be of a type commercially available and used in conjunction with products manufactured under the trademark Funk by the assignee of the present invention.

Those skilled in the art will recognize that the transmission control system described and claimed herein may be modified in various ways including modification of the signal transmitted from the electronic control circuit to the control valves in accordance with vehicle speed, torque input to the transmission and payload on board the vehicle. Moreover, the control valves 34, 36, 38, 46 and 48 could also be modified to be of a type to receive a continuously variable signal which would permit variation in the rate of fluid flow to the respective clutches associated with these valves to control the clutch engagement characteristics.

Although the simplified control system utilizing the single proportional solenoid vavle 70 for controlling the operating characteristics of the pressure regulator or modulator valve 82 provides for selective engagement characteristics for only the forward or reverse directional clutches. The various speed range clutches can be engaged and disengaged through conventional remotely controlled valves and the transmission shift characteristics can be optimally controlled by controlling the flow of fluid to and from the respective directional clutches. This modulation or control can be provided during each range shift. In addition, a microprocessor based controller can provide the optimum modulation function according to the specific range clutch being applied.

Although a preferred embodiment of the invention has been described in detail herein those skilled in the art will recognize that various substitutions and modifications can be made to the control system illustrated and described without departing from the scope and spirit of the invention as recited in the appended claims.

What we claim is:

1. A control system for selectively controlling the hydraulic fluid pressure supplied by a pump to the directional clutch valves in a powershift-type transmission, comprising:
   a first valve having a piston reciprocably disposed between first and second ends of a cylinder and biasing means disposed between said piston and said second cylinder end for biasing said piston toward said first cylinder end;
   said first cylinder end being in fluid communication with the pump and at least one of the directional clutch valves;
   said piston having an open position when biased toward said first cylinder end allowing fluid passage between the pump and the one of the directional clutch valves and a closed position when biased toward said second cylinder end preventing fluid passage between the pump and the one of the directional clutch valves;
   said first valve further including a feed back port extending between the pump and said second cylinder end allowing fluid flow therebetween in both said open and closed positions of said piston, said feedback port having a restriction to fluid flow therethrough;
   a second vlave providing a fluid passage to vent said second cylinder end;
   actuator means for opening and closing said second valve whereby upon opening said fluid passage, the hydraulic fluid in said second cylinder end is displaced through said fluid passage reducing the hydraulic fluid pressure in said second cylinder end and causing a pressure differential across said piston due to the retarded flow through said feedback port such that said piston moves to said closed position.

2. The control system of claim 1 further including signal means for sending signals to said actuator means causing said second valve to open and close.

3. The control system of claim 2 wherein said signals sent by said signal means are pulses causing said second valve to pulse open and closed, causing said piston to move to said closed position.

4. The control system of claim 3 wherein the duration of said pulses is proportional to the duration of the opening of said second valve.

5. The control system of claim 2 wherein said signal means is a preprogrammed logic circuit.

6. The control system of claim 1 wherein said first valve is a spool valve and said piston is a spool.

7. The control system of claim 1 wherein said second valve is a needle valve.

8. The control system of claim 1 wherein said actuator means is a solenoid.

9. A system for selectively controlling the directional and range clutches in a powershift-type transmission upon the positioning of the accelerator and gear shift selector, comprising:
   directional clutch valves in fluid communication with the directional clutches;
   directional clutch solenoids mounted on said directional clutch valves for actuating said directional clutch valves;
   range clutch valves in fluid communication with the range clutches;
   range clutch solenoids mounted on said range clutch valves for actuating said range valves;
   a pump for supplying hydraulic fluid under pressure;
   a regulator valve in fluid communication with said pump for regulating the pressure of the hydraulic fluid and supplying hydraulic fluid to said range clutch valves;
   a modulated spool valve having a cylinder in which is disposed a spool and a spring to bias said spool toward one end of said cylinder, said cylinder being in fluid communication with said regulator valve and one of said directional clutch valves;
   said spool having an open position allowing fluid passage from said regulator valve to said directional clutch valves and a closed position preventing fluid passage to said directional clutch valves, said spring biasing said spool to said open position;
   said modulated spool valve further including a feedback port allowing fluid flow from said regulator valve to that portion of said cylinder between said spool and the other end of said cylinder, said feedback port having an orifice for restricting fluid flow therethrough;
   a needle valve providing a fluid passage to vent said portion of said cylinder, said needle valve having a valve stem for opening and closing said fluid passage whereby upon opening said fluid passage, the fluid pressure within said portion of said cylinder is vented due to the restricted fluid flow through said feedback port caused by said orifice such that the pressure differential across said spool overcomes the biasing of said spring and said spool moves to said closed position;

a needle valve solenoid attached to said valve stem for selectively reciprocating said valve stem to open and close said fluid passage; and control means for detecting the position of the accelerator and gear shift selector and providing selected signals to selected ones of said solenoids for controlling the directional and range clutches.

10. The system of claim 9 wherein said control means is a preprogrammed logic circuit sending pulses to said needle valve solenoid causing said valve stem to oscillate within said fluid passage in response to said pulses to rapidly open and close said fluid passage to control the movement of said spool to said closed position.

11. The system of claim 10 wherein said preprogrammed logic circuit sends said pulses at a predetermined frequency and the duration of each of said pulses varies from zero to one hundred percent of the duration of each cycle of said predetermined frequency.

12. The system of claim 10 wherein said preprogrammed logic circuit sends said pulses at a predetermined frequency, the duration of each of said pulses varying from zero to one hundred percent of the duration of each cycle of said predetermined frequency, said predetermined logic circuit varies said duration of said pulses in response to the position of the accelerator and gear shift selector, said spool oscillation is directly proportional to said valve stem oscillation as siad spool moves to said position and said spool oscillation causing the fluid pressure in the directional clutch to also oscillate whereby the directional clutch slips a predetermined amount during a shift from one speed range to another speed range, greater pulse durations causing the directional clutch to have a longer slip period than short duration pulses.

13. The system of claim 10 wherein said spool slidingly oscillates in said cylinder to open and close said fluid passage to said directional clutches in response to said valve stem oscillation, said preprogrammed logic circuit sends said pulses at a predetermined frequency, the duration of each of said pulses varying from zero to one hundred percent of the duration of each cycle of said predetermined frequency, said predetermined logic circuit varies said duration of said pulses during the engagement of one of the directional clutches and a range clutch upon a shift from neutral to first range to cause the directional clutch to slip until the range clutch is fully applied.

14. A pilot-operated hydraulic control valve system for controlling hydraulic fluid pressure used to engage and disengage directional and range clutches in an automatic transmission, comprising:

range valve selector means for controlling the actuation of range valves to select a transmission range;

directional clutch apply valves to selectively communicate hydraulic fluid to engage disengage the directional clutches;

a modulated spool valve having a first bore for receiving a valve spool, a second bore coaxially aligned therewith and having a spring therein biasing said spool in said first bore, and a restricted feedback passage communicating hydraulic fluid pressure between said first bore and said second bore;

said spool having ends sized for sliding engagement with said first bore and a cylindrical recess therebetween for selective communication with passageways communicatin with said first bore;

a variable orifice in fluid communication with said second bore to selectively exhaust hydraulic fluid therefrom;

a main pressure passage communicating hydraulic fluid pressure from a main pressure source in the transmission to said first bore and said feedback passage;

a first bore exhaust passage in hydraulic communication with said first bore;

a clutch pressure passage in hydraulic communication with said first bore and said directional clutch apply valves;

said spool biased to move in said bore against said spring when hydraulic fluid pressure in said second bore is exhausted to block communication of said main pressure passage with said clutch pressure passage, said cylindrical recess thereby permitting communication between said clutch pressure passage and said first bore exhaust bore causing the hydraulic fluid in said clutch pressure passage to exhaust through said cylindircal recess and said exhaust passage, said spool biased toward said first bore when said orifice is closed blocking hydraulic communication between said clutch pressure passage and said exhaust passage, and reestablishing hydraulic communication between said main pressure passage and clutch pressure passage whereby main hydraulic pressure is communicated to said clutch pressure passage;

a control means for controlling said range valve selector means and the actuation of said variable orifice by an electric signal to said variable orifice at a pulsed frequency to cause said orifice to selectively exhaust said second bore, signals with greater pulse width causing said orifice to exhaust said second chamber for proportionately greater periods of each cycle of said pulsed frequency; and pulse width means for modifying the width of each pulsed signal transmitted in each pulse.

15. The control valve system of claim 14 wehrein said control means is programmed to actuate said variable orifice to modulate said modulated spool valve during transmission shifts between speed ranges, whereby the hydraulic fluid pressure is lowered in a selected one of the directional clutches thereby allowing the directional clutch to slip during engagement of the range clutches.

16. The system of claim 14 wherein said variable orifice includes a solenoid-controlled needle valve and control solenoid attached thereto, said needle valve having a chamber and a needle stem selectively disposed within said chamber, said control solenoid controlling the movement of said needle stem within said chamber.

17. A control system for controlling the actuation of directonal and range clutches in a powershift-type transmission in response to the positioning of an accelerator and shift selector, comprising:

pump means for supplying hydraulic fluid under pressure;

regulating means for regulating the maximum pressure of said hydraulic fluid;

conducting means for conducting said regulated hydraulic fluid pressure from said regulating means to the directional and range clutches;

directional clutch selector valves;

range clutch control valves for selectively communicating regulated hydraulic fluid pressure to a selected one of the range clutches;

a modulating valve having a first bore for receiving a spool to slide therein, a coaxial second bore having a spring therein to bias said spool in said first bore, and a feedback passage having an orifice for communicating hydraulic fluid pressure between said pump means, said first bore and said second bore;

said spool having ends sized to slidingly engage said first bore and a reduced diameter portion between said ends;

a needle valve having a valve chamber to evacuate fluid pressure therefrom and needle means reciprocably disposed in said valve chamber;

a regulator pressure passage in hydraulic communication with said first bore to supply regulated hydraulic pressure thereto;

a pilot passage providing hydraulic communication between said needle valve chamber and said second bore;

a directional clutch valve passage in hydraulic communication with said first bore to supply fluid pressure to said directional clutch selector valves;

electric solenoids attached to said needle valve, said directional clutch control valves and said range clutch control valves for controlling the actuation of said valves;

actuation of said needle means to open said valve chamber causing fluid pressure in said valve chamber to evacuate through said pilot passage causing said spool to move in said first bore against said spring to block hydraulic communication of said regulated pressure passage with said directional clutch valve passage whereby the fluid pressure in said directional clutch valve passage is decreased, and actuation of said needle means to close said valve chamber causing fluid pressure in said second chamber to increase causing said spring to bias said spool to move in said first bore to allow unrestricted communication between said regulated pressure passage and directional clutch valve passage; and a preprogrammed shift cycle controller having communication means for communicating with the accelerator and shift selector for determining their position and solenoid positioning means for positioning said solenoids to selectively engage the range clutches and the directional clutches in a predetermined manner based upon the position of the acceleraotr and the shift selector.

18. A system for controlling the hydraulic fluid pressure between a hydraulic fluid source and directional clutches and range slutches of a powershift-type transmission to selectively engage teh clutches for a desired transmission range in response to the position of an accelerator and shift selector, comprising:

solenoid-controlled directional and range slutch actuator valves;

a pump for supplying hydraulic fluid pressure under pressure;

a regulator valve in hydraulic communication with said pump to regulate the fluid pressure from said pump;

a solenoid-controlled needle valve having a valve chamber and a vlave stem actuable in and out of said chamber in response to selective energization by a needle valve solenoid;

a modulator spool valve for modulating hydraulic fluid pressure having a first valve bore having a spool with a medial reduced diameter portion slidingly disposed therein and a coaxial second valve bore having a spring therein biasing said spool within said first valve bore, a feedback passage with an orifice therein extending between said second valve bore and said first valve bore at a first bore annulus disposed about the circumference of said first bore;

a second bore passage extending between said second valve bore and said needle valve chamber;

a modulated clutch supply passage extending between said first bore and said clutch actuator valves;

a first bore exhaust passage to vent said first bore;

a regulator pressure supply passage in hydraulic communication with said first bore regulator valve and said first bore annulus, said feedback passage, and said range clutch actuator valves, movement of said spool in said first bore causing said spool to selectively open or block communication of said modulated clutch supply passage with said regulator supply pressure passage, and to selectively open or block communication between said modulated clutch supply pressure passage and said exhaust passage through said spool medial reduced diameter portion;

movement of said stem in and out of said chamber causing said spool to move in said first bore;

a preprogrammed logic circuit providing output signals to said needle valve solenoid and said range and directional clutch valve solenoids to control the communication of hydraulic fluid under pressure through said directional and range clutch vlaves to control the actuation of the directional and range clutches in the transmission;

an accelerator positoin read means for detecting the position of the accelerator and converting the position into an electrical signal to be read by said logic circuit;

a shift selector read means for detecting and communicating the position of the shift selector to said logic circuit;

said output signal to said needle valve solenoid having a pulse frequency; and each cycle of said frequency having a variable duration pulse therein, said needle valve solenoid moving said stem out of said chamber in response to said pulses, the duration of each pulse directly proportional to the duration of said stem out of said chamber.

* * * * *